(12) United States Patent
Lee

(10) Patent No.: US 12,299,121 B2
(45) Date of Patent: May 13, 2025

(54) ELECTRONIC DEVICE WITH SECURITY CIRCUIT AND SECURITY MEMORY

(71) Applicant: SAMSUNG ELECTRONICS CO., LTD., Suwon-si (KR)

(72) Inventor: Jeehyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 323 days.

(21) Appl. No.: 18/147,264

(22) Filed: Dec. 28, 2022

(65) Prior Publication Data

US 2023/0289437 A1  Sep. 14, 2023

(30) Foreign Application Priority Data

Mar. 10, 2022  (KR) .......................... 10-2022-0030118

(51) Int. Cl.
*G06F 21/55* (2013.01)
*G06F 21/60* (2013.01)
*H04L 9/40* (2022.01)

(52) U.S. Cl.
CPC .......... *G06F 21/554* (2013.01); *G06F 21/602* (2013.01); *H04L 63/1416* (2013.01); *G06F 2221/034* (2013.01)

(58) Field of Classification Search
CPC ...... G06F 21/55; G06F 21/554; G06F 21/602; G06F 21/72; G06F 21/75; G06F 21/78; G06F 21/88; G06F 21/71; G06F 21/725; G06F 21/74; G06F 21/86; G06F 2221/034; G06F 3/0637; G08B 21/18; H04L 9/002; H04L 63/1416; H04L 2209/12; H04W 12/121; H04W 12/33; H04W 12/60; G01R 19/16552

See application file for complete search history.

(56) References Cited

U.S. PATENT DOCUMENTS

| | | | |
|---|---|---|---|
| 5,533,123 A * | 7/1996 | Force | G06F 21/725 |
| | | | 713/189 |
| 6,553,496 B1 | 4/2003 | Buer | |
| 7,039,815 B1 | 5/2006 | Grassl et al. | |
| 7,045,915 B2 | 5/2006 | Otani et al. | |
| 7,085,979 B2 | 8/2006 | Kim et al. | |
| 7,159,153 B2 | 1/2007 | Kim | |
| 7,454,633 B2 | 11/2008 | Sung et al. | |
| 9,575,903 B2 * | 2/2017 | Glew | G06F 21/71 |

(Continued)

*Primary Examiner* — Le H Luu
(74) *Attorney, Agent, or Firm* — MORGAN, LEWIS & BOCKIUS LLP

(57) ABSTRACT

Disclosed is an electronic device with a security circuit. The electronic device includes one or more detectors that detect an external attack, a monitoring circuit that receives a detection signal from the one or more detectors in response to the external attack, and generates attack information about the attack from the detection signal, and a security circuit that is implemented with hard-wired logic and is activated in a security mode. The security circuit includes a controller that receives the attack information from the monitoring circuit and determines whether a security event has occurred by calculating an attack count from the attack information, and a security memory that encrypts and stores event information about the security event responsive to a determination from the controller that a security event has occurred.

20 Claims, 11 Drawing Sheets

(56) References Cited

U.S. PATENT DOCUMENTS

| | | | |
|---|---|---|---|
| 2016/0078226 A1 | 3/2016 | Dalton et al. | |
| 2017/0357829 A1* | 12/2017 | Park | G06F 21/86 |
| 2021/0037050 A1* | 2/2021 | Ree | H04L 63/1416 |
| 2021/0374290 A1* | 12/2021 | Bildhaiya | G06F 21/74 |
| 2022/0006459 A1* | 1/2022 | Bautista Gabriel | G01R 19/16552 |
| 2022/0164297 A1* | 5/2022 | Sity | G06F 3/0637 |
| 2022/0201000 A1* | 6/2022 | Kim | H04W 12/60 |
| 2022/0269645 A1* | 8/2022 | Hillel | G06F 3/0637 |

* cited by examiner

ELECTRONIC DEVICE WITH SECURITY CIRCUIT AND SECURITY MEMORY

CROSS-REFERENCE TO RELATED APPLICATION

This application claims priority under 35 U.S.C. § 119 to Korean Patent Application No. 10-2022-0030118 filed on Mar. 10, 2022, in the Korean Intellectual Property Office, the disclosure of which is incorporated by reference herein in its entirety.

TECHNICAL FIELD

Embodiments of the present disclosure described herein relate to an electronic device with a dedicated security monitoring circuit and memory, and more particularly, relate to an electronic device including a security memory storing information about a security event when an external attack is detected in a security mode and an operating method thereof.

DISCUSSION OF THE RELATED ART

Electronic devices are used ubiquitously for many different applications. User electronic devices, such as smartphones, tablet personal computers (PCs), laptop PCs, and wearable devices are used to facilitate the transfer of information. For example, user electronic devices can be configured to communicate with other electronic devices. An electronic device may output data to another electronic device over a network or communication protocol, and may receive data output from the other electronic device.

When an electronic device outputs data, it is acting as a transmitter. When it receives data, it acts as a receiver. In some cases, the receiver performs an operation according to the direction of a transmitter. This is useful for applications such as collaborating on shared documents, or remote operation of a device. In some cases, an untrusted transmitter may take control of the device in this way, or an attacker may modify the communication of a trusted transmitter during transmission.

To prevent such attacks from resulting in losses or damage, the receiver may include a security integrated circuit (IC) that detects an external attack; when an external attack is detected, the security IC may forcibly kill some or all of functions of the receiver. However, when some or all of the functions are killed by software, it may be difficult to analyze the attack for additional information.

SUMMARY

Embodiments of the present disclosure include an electronic device configured to reliably store information about a security event, without the intervention of software, even when some or all of functions of a receiver are forcibly killed due to an external attack, and an operating method thereof.

According to an embodiment, an electronic device includes one or more detectors that detect an external attack, a monitoring circuit that receives a detection signal from the one or more detectors in response to the external attack and generates attack information about the external attack from the detection signal, and a security circuit that is activated in a security mode, wherein the logic of the security circuit is hard-wired through its circuitry and cannot be intervened by software. The security circuit includes a controller that receives the attack information from the monitoring circuit and determines whether a security event has occurred by calculating an attack count from the attack information, and a security memory that encrypts and stores event information about the security event.

According to an embodiment, an operating method of an electronic device which includes a security circuit includes enabling a security mode of the electronic device in response to an enable signal for the security circuit; detecting an external attack and generating attack information about the attack while in the security mode; determining whether a security event has occurred by calculating an attack count based on the attack information; responsive to a determination that the security event has occurred, generating a kill signal configured to disable one or more components of the electronic device; and responsive to a determination that the security event has not occurred, storing event information about the security event and generating a reset signal, wherein the logic of the security circuit is hard-wired through its circuitry.

According to an embodiment, a system includes a memory device that includes a security circuit, wherein the logic of the security circuit is hard-wired through its circuitry, and wherein the security circuit is activated in a security mode, and a reader that reads event information stored in the security circuit. The security circuit includes a controller that receives attack information about an external attack and determines whether a security event has occurred by calculating an attack count from the attack information, and a security memory that encrypts and stores the event information about the security event.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
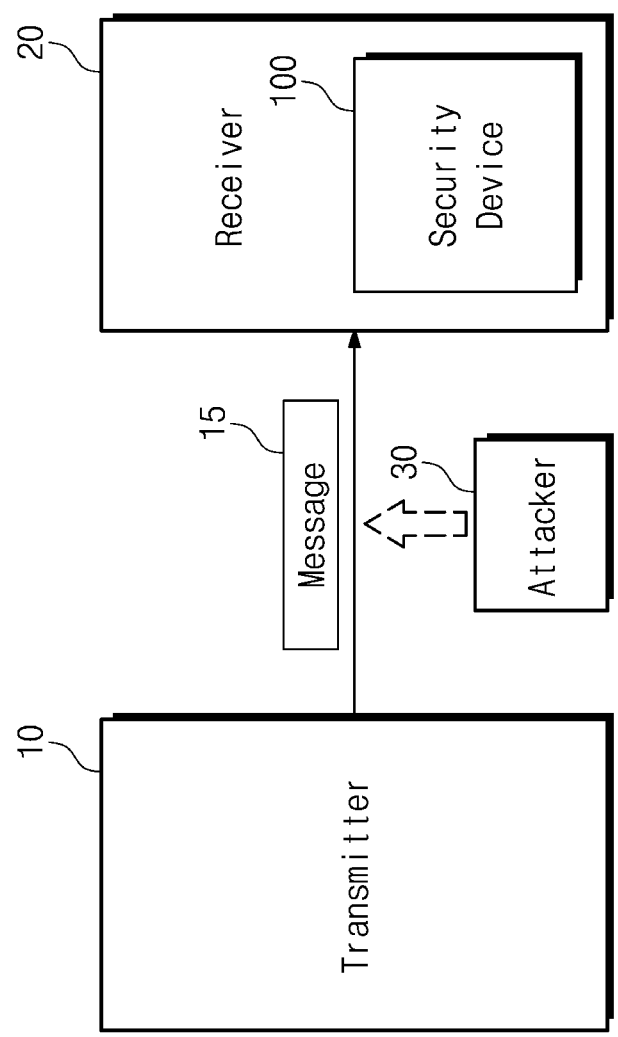
FIG. 1 is a block diagram that illustrates a transceiver system according to an embodiment of the present disclosure.

Hereinafter, various embodiments of the inventive concepts will be described with reference to the accompanying drawings. Like reference symbols in the drawings may denote like elements, and to the extent that a description of an element has been omitted, it may be understood that the element is at least similar to corresponding elements that are described elsewhere in the specification.

FIG. 1 is a block diagram that illustrates a transceiver system according to an embodiment of the present disclosure. Referring to FIG. 1, a transceiver system may include a transmitter 10 and a receiver 20. The transmitter 10 and the receiver 20 may each be implemented in a device capable of storing data, such as a smartphone, a tablet personal computer (PC), a laptop PC, and a wearable device.

The transmitter 10 may transmit a security message including a message 15 to the receiver 20. The receiver 20 may include an electronic device with a security circuit and memory according to embodiments of the present disclosure. The message 15 may include information about an operation that the transmitter 10 directs to the receiver 20.

According to an embodiment, an attacker 30 may intervene in the transceiver system. The attacker 30 may be an electronic device or system other than the transmitter 10 and the receiver 20. The attacker 30 may intercept and modify the message 15 that is transmitted from the transmitter 10 to the receiver 20 and may transmit the modified message the receiver 20. In some cases, the attacker 30 may imitate the transmitter 10 and internally generate a message and may transmit the message to the receiver 20.

The receiver 20 may include a security device 100 configured to detect an attack from the attacker 30. The receiver 20 may operate in response to the message 15 transmitted from the transmitter 10 using the security device 100. For example, the security device 100 may determine whether or not a security event occurs. When it is determined that the security event does not occur, the receiver 20 may be reset and may again perform an operation corresponding to the message 15. When it is determined that the security event occurs, the receiver 20 may kill an operation corresponding to the message 15.

According to an embodiment, the security device 100 may include a nonvolatile memory. The nonvolatile memory may store event information about the security event. Accordingly the event information may be read and analyzed by a reader with administrative privileges even after processes of the receiver 20 have been terminated. This will be described in detail with reference to FIG. 8.

According to an embodiment, a part of the security device 100 may be implemented with hard-wired logic. For example, the security device 100 may determine the security event by using hardware (e.g., circuitry) without the intervention of software and may store event information. Accordingly, the security device 100 may reduce the receiver's vulnerability to software, and may enable a safe countermeasure in the event of an attack.

Below, components and operations of the security device 100 will be described in detail with reference to drawings. Hereinafter, the security device 100 may be called an electronic device or a memory device with a security circuit.

Figure 2:
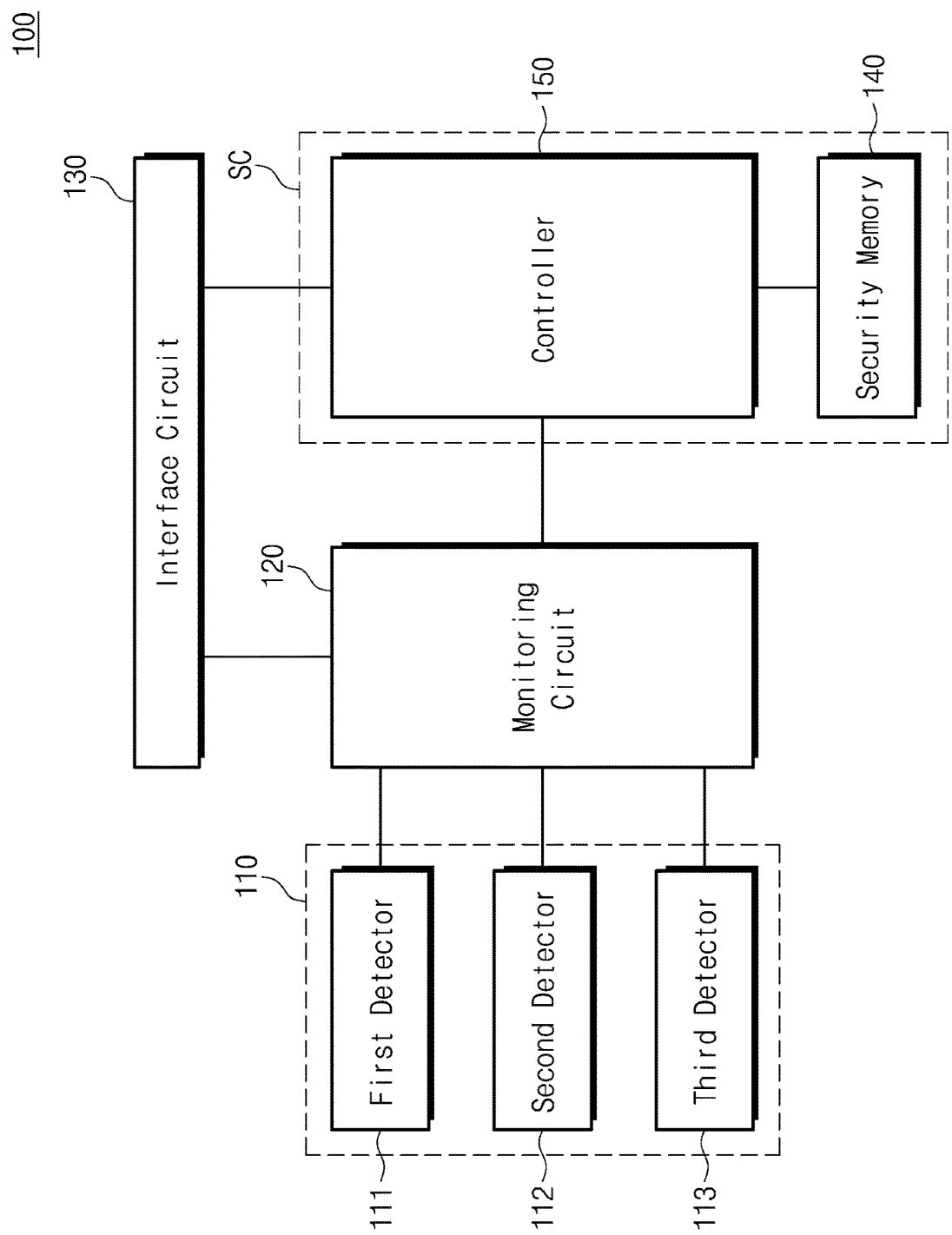
FIG. 2 is a block diagram that illustrates a security device of FIG. 1.

FIG. 2 is a block diagram that illustrates a security device of FIG. 1. Referring to FIG. 2, the security device 100 may include one or more detectors 110, a monitoring circuit 120, an interface circuit 130, a security memory 140, and a controller 150.

The security device 100 may be included in security products such as a smart card, an embedded security element (eSE), a universal subscriber identity module (USIM) card, a financial security and identification (FSID) card, a mobile trusted platform module (TPM), a brand protection product, an IoT (internet of things) wearable device product, and others according to various embodiments.

The one or more detectors 110 may be configured to detect an attack from outside of the security device 100. The one or more detectors 110 may include a first detector 111, a second detector 112, and a third detector 113. FIG. 2 illustrates an example in which the number of detectors is 3 is illustrated, but the number of detectors is not limited thereto.

The first detector 111 may include a frequency detector. The second detector 112 may include a voltage detector. The third detector 113 may include a temperature detector. The types of the first to third detectors 111, 112, and 113 may vary according to embodiments. For example, one of the first to third detectors 111, 112, and 113 may be a light exposure detector or a glitch detector.

When one or more of the first to third detectors 111, 112, and 113 detect an abnormal signal, such as a signal outside of a reference value, the one or more of the first to third detectors 111, 112, and 113 may generate a detection signal associated with an attack. For example, the frequency detector may be configured to detect a main clock frequency and to generate a detection signal when the detected frequency is out of a regulation range. The voltage detector may be configured to detect a level of a voltage supplied from the outside (e.g., from a power supply unit of the electronic device) and to generate a detection signal when the detected voltage level is out of a rated range. The temperature detector may be configured to detect an ambient temperature of the security device 100 and to generate a detection signal when the detected temperature is higher or lower than a reference range. A light exposure sensor may be configured to generate a detection signal when a silicon oxide layer used as a protection layer of the security device 100 is removed and is exposed to an external light. A glitch detector may be configured to detect abnormal changes in a signal. For example, it may be configured to detect fluctuations of a power supply voltage and to generate a detection signal when the power supply voltage changes suddenly.

The monitoring circuit 120 may be configured to receive the detection signal from at least one of the detectors 110 and to generate attack information about the attack based on the attack detection signal. According to an embodiment, the attack information may include information about properties of the attack, such as the attack kind, the attack time, and the attack level. In an illustrative example, the monitoring circuit 120 may receive the detection signal from the first detector 111, monitor the detection signal, and generate attack information indicating that a voltage modulation attack was detected at 14:00.

The monitoring circuit 120 may provide the attack information to another component of the electronic device according on an operating mode. For example, in a normal mode, the monitoring circuit 120 may provide the attack information to the outside of the security device 100 through the interface circuit 130. In the security mode, the monitoring circuit 120 may provide the attack information to the controller 150. The security mode may refer to an operating mode in which a security circuit SC is activated, and the normal mode may refer to an operating mode in which the security circuit SC is deactivated.

The security mode may be enabled by an enable signal associated with the security circuit SC. According to an embodiment, the enable signal may be generated by a selection signal of the user when the security device 100 is powered on, but methods for generating the enable signal is not limited thereto. For example, the enable signal may be automatically generated periodically (or at regular intervals).

The interface circuit 130 may be configured to exchange signals between the security device 100 and external devices. For example, the monitoring circuit 120 may store the attack information in an external memory through the interface circuit 130. For example, the controller 150 may receive the enable signal through the interface circuit 130. In some embodiments the monitoring circuit 120 may receive detection signals from additional detectors of external devices through the interface circuit 130.

The security memory 140 may be configured to store the event information about the security event. According to an embodiment, the event information may include the attack information and an attack count. The event information may be encoded and may be stored in the security memory 140. According to an embodiment, the security memory 140 may include a nonvolatile memory. For example, the nonvolatile memory may include a flash memory, an MRAM, a PRAM, an FRAM, or the like.

In the security mode, the controller 150 may receive the attack information from the monitoring circuit 120 and to determine whether the security event occurs, based on the attack information. The controller 150 may check an existing attack count stored in the security memory 140 and may determine the existing attack count corresponds to a maximum attack count. For example, the controller 150 may determine that the existing attack count stored in the security memory 140 meets or excides the maximum attack count. Information about the maximum attack count may be stored in the security memory 140.

According to an embodiment, the existing attack count that is an accumulated attack count may refer to the number of times that an attack is made, for example, within a time period. The maximum attack count that is a maximum accumulation count of the attack may refer to an attack count that is permitted until a kill signal is generated. Methods for determining whether the security event occurs based on the attack count will be described in detail with reference to FIG. 5.

The controller 150 may determine that the security event occurs based on a determination that the existing attack count has reached the maximum attack count. When the security event occurs, the controller 150 may generate the kill signal. According to an embodiment, the kill signal may be provided to the external devices through the interface circuit 130 and may cause a device (e.g., the receiver 20 of FIG. 1) including the security device 100 not to perform operations corresponding to a message or a command.

The controller 150 may determine that the security event does not occur based on a determination that the existing attack count has not reached the maximum attack count. The controller 150 may update the existing attack count and may generate the event information. According to an embodiment, the controller 150 may match the attack information with the attack count to generate the event information.

For example, when the attack information is received, the controller 150 may determine the existing attack count, for example, to be "1". In an example, the maximum attack count is "5", and therefore the controller 150 may determine that the existing attack has not reached the maximum attack count and may update the existing attack count. For example, the existing attack count may be increased by +1 so as to be changed to "2". The controller 150 may generate the event information indicating that the second attack (i.e., the attack corresponding to the existing attack count of "2") is a voltage modulation attack made at 14:00, for example.

In response to determining that the existing attack count does not correspond to the maximum attack count, the controller 150 may generate the event information and may generate a reset signal. The reset signal may be provided to one or more components of the security device 100, and the one or more detectors 110 may return to an initial setting or state in response to the reset signal. For example, a detection frequency range may be changed due to an abnormal signal detected, and the first detector 111 may return to the initial setting state or a preset reference in response to the reset signal.

According to an embodiment, the security memory 140 and the controller 150 may be included in the security circuit SC. The security circuit SC may be implemented with hard-wired logic and may be configured to enable the security mode. For example, the security circuit SC may include circuitry that implements logic to directly determine and record security attacks. When an attack is detected, the security circuit SC may automatically count the number of times of attack by using a hardware component without the intervention of software, and store the event information. In this way, the event information may be later analyzed despite killing processes of the electronic device in which the security device 100 is stored to protect the electronic device. Accordingly, the security device 100 according to an embodiment of the present disclosure may safely detect an attack and may store the security event.

Figure 3:
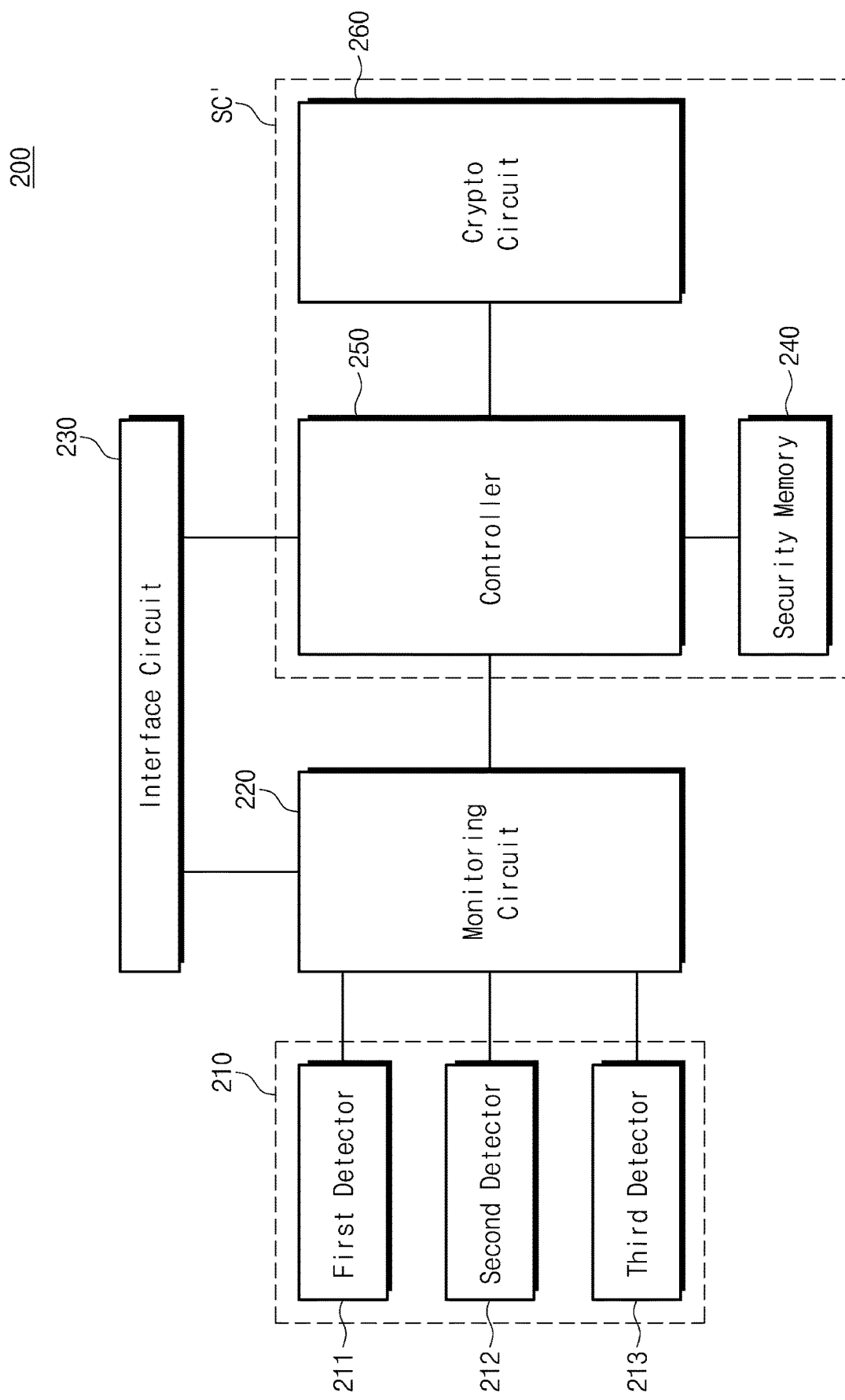
FIG. 3 is a block diagram that illustrates another example of a security device of FIG. 1.

FIG. 3 is a block diagram that illustrates another example of a security device of FIG. 1. Referring to FIG. 3, a security device 200 may include one or more detectors 210, a monitoring circuit 220, an interface circuit 230, a security memory 240, a controller 250, and a crypto circuit 260. The one or more detectors 210, the monitoring circuit 220, the interface circuit 230, the security memory 240, and the controller 250 are the same as or similar to the one or more detectors 110, the monitoring circuit 120, the interface circuit 130, the security memory 140, and the controller 150 of FIG. 2, and thus, redundant description will be omitted.

The one or more detectors 210 may be configured to detect an attack from the outside. For example, the one or more detectors 210 may include a first detector 211, a second detector 212, and a third detector 213. When one or more detectors 210 detect an abnormal signal, such as a signal that is out of a reference value, each of the one or more detectors 210 may generate a detection signal associated with an attack.

The monitoring circuit 220 may receive the detection signal from each of the one or more detectors 210, may monitor the detection signal, and may generate attack information. According to an embodiment, the attack information may include information about the attack such as the attack kind, the attack time, and the attack level.

The interface circuit 230 may be configured to exchange signals between the security device 200 and external devices. For example, in the normal mode, the monitoring circuit 220 may provide the attack information to an external memory through the interface circuit 230. In some embodiments, during a security mode, the monitoring circuit 220 may provide the attack information only to the controller 250.

The security memory 240 may be configured to store the event information about the security event. According to an embodiment, the event information may include matching information between attack information and an attack count.

According to an embodiment, the security memory 240 may include a nonvolatile memory.

The controller 250 may receive the attack information from the monitoring circuit 220 and determine whether the security event occurs by getting the attack count from the attack information. According to an embodiment, the controller 250 may check an existing attack count stored in the security memory 140 and determine whether the existing attack count has reached a maximum attack count.

The controller 250 may determine that the security event occurs when the existing attack count has reached the maximum attack count. When the security event occurs, the controller 250 may generate the kill signal.

The controller 250 may determine that the security event does not when the existing attack count is less than the maximum attack count. The controller 250 may then update the existing attack count and may generate event information. Also, the controller 250 may generate the reset signal.

The crypto circuit 260 may be configured to encode pieces of information that are stored in the security memory 240. For example, the crypto circuit 260 may encrypt (or encode) the event information about the security event. Also, the crypto circuit 260 may encrypt information about the existing attack count and information about the maximum attack count and may store the encrypted information in the security memory 240. According to an embodiment, the crypto circuit 260 may encrypt information according to an encryption algorithm. For example, the given encryption manner may include an advanced encryption standard (AES) encryption algorithm, a data encryption standard (DES) encryption algorithm, a SEED encryption algorithm, or the like.

In some embodiments, the crypto circuit 260 is included in the controller 250.

According to an embodiment, a security circuit SC' may include the security memory 240, the controller 250, and the crypto circuit 260. For example, the security memory 240, the controller 250, and the crypto circuit 260 may be implemented with hard-wired logic and may operate without being controlled by software.

Figure 4:
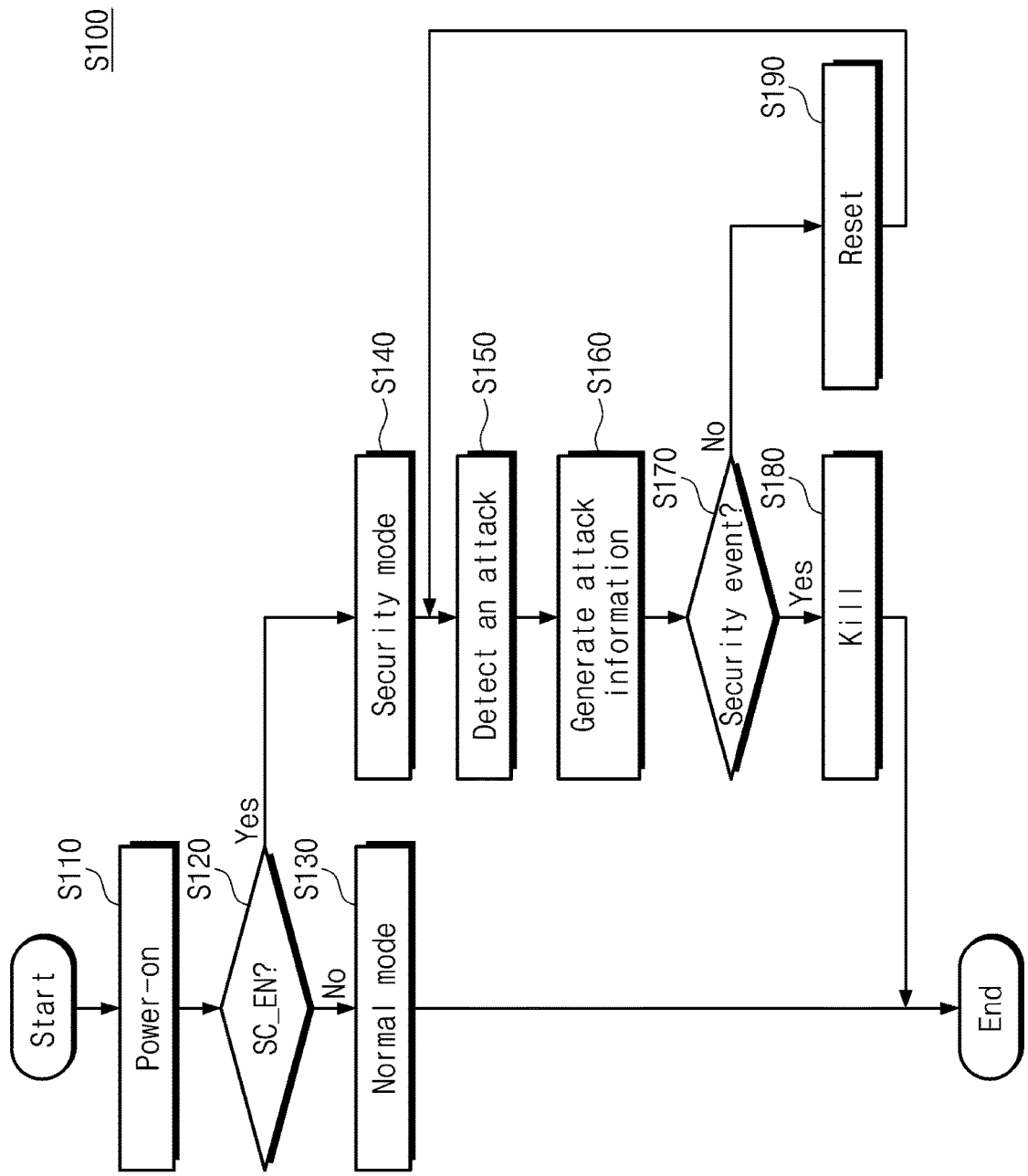
FIG. 4 is a flowchart that illustrates an operating method of a security device according to an embodiment of the present disclosure.

FIG. 4 is a flowchart that illustrates an operating method of a security device according to an embodiment of the present disclosure. Referring to FIGS. 2 and 4, in operation S110, the security device 100 may be supplied with a power from a power device, and may be powered on. Accordingly, the security device 100 may initiate the operations according to FIG. 4.

In operation S120, the security device 100 may determine whether an enable signal SC_EN for the security circuit SC is received. The enable signal SC_EN may be received based on a selection signal of the user, but the present disclosure is not limited thereto. For example, the security device 100 may receive the enable signal SC_EN at regular intervals based on a configuration of the system, or the like. According to an embodiment, the enable signal SC_EN may be generated by an external processor (e.g., a central processing unit (CPU)).

During a period when the enable signal SC_EN is not received, in operation S130, the security device 100 may operate in the normal mode. In some embodiments, the security device 100 receives a disable signal for the security circuit SC and may operate in the normal mode based on the disable signal.

For example, in the normal mode, the security circuit SC of the security device 100 may be in a disabled state. In this state, the monitoring circuit 120 may not provide the attack information to the controller 150. Instead, the monitoring circuit 120 may provide the attack information to an external memory. In this case, the attack information may be stored in the external memory under the direction of software, firmware, or other methods implemented through an external circuit.

When the enable signal SC_EN is received, in operation S140, the security device 100 may operate in the security mode. For example, in the security mode, the security circuit SC of the security device 100 may be in an enabled state. In this state, the monitoring circuit 120 may providing the attack information to the controller 150. The controller 150 may determine whether the security event occurs based on the attack information.

In operation S150, the security device 100 may detect the attack. For example, the one or more detectors 110 may detect the attack based on an abnormal signal received by a detector, such as a signal that is out of a reference value. According to an embodiment, the preset reference may change depending on a security level. The security level of the security device 100 may be set in the process of manufacturing the security device 100; the higher the security level, the more sensitive the security device 100 may be to an attack. For example, as the security level increases, the rated range may become narrower. When detecting the abnormal signal, the security device 100 may generate a detection signal associated with the attack.

In operation S160, the security device 100 may generate the attack information about the attack based on the detection signal. According to an embodiment, the attack information may include information about the attack, such as the attack kind, the attack time, and an attack level. The monitoring circuit 120 may generate the attack information about the attack. In the security mode, the monitoring circuit 120 may provide the attack information to the controller 150.

In operation S170, the security device 100 may determine whether the security event occurs, based on the attack information. For example, the controller 150 may determine whether the security event occurs by counting the number of times that an attack has been made. The controller 150 may measure the number of times the attack has been made over a set period of time, or since a reset period, according to various embodiments. This will be described in detail with reference to FIG. 5.

In operation S180, the security device 100 may generate a kill signal in response to determining that the security event occurs. For example, when the security event occurs, the controller 150 may generate the kill signal. The kill signal may be provided to the external processor through the interface circuit 130. The external processor may stop performing operations corresponding to a message or a command based on the kill signal.

In operation S190, responsive to a determination that the security event did not occur, the security device 100 may store the event information about the security event and may generate the reset signal. According to an embodiment, the event information may include the attack information and an attack count. For example, the event information may be encrypted and stored in the security memory 140. For example, the controller 150 may generate the reset signal and may provide the reset signal to the one or more detectors 110 and the monitoring circuit 120. The one or more detectors 110 and the monitoring circuit 120 may return to the initial setting state in response to the reset signal.

Figure 5:
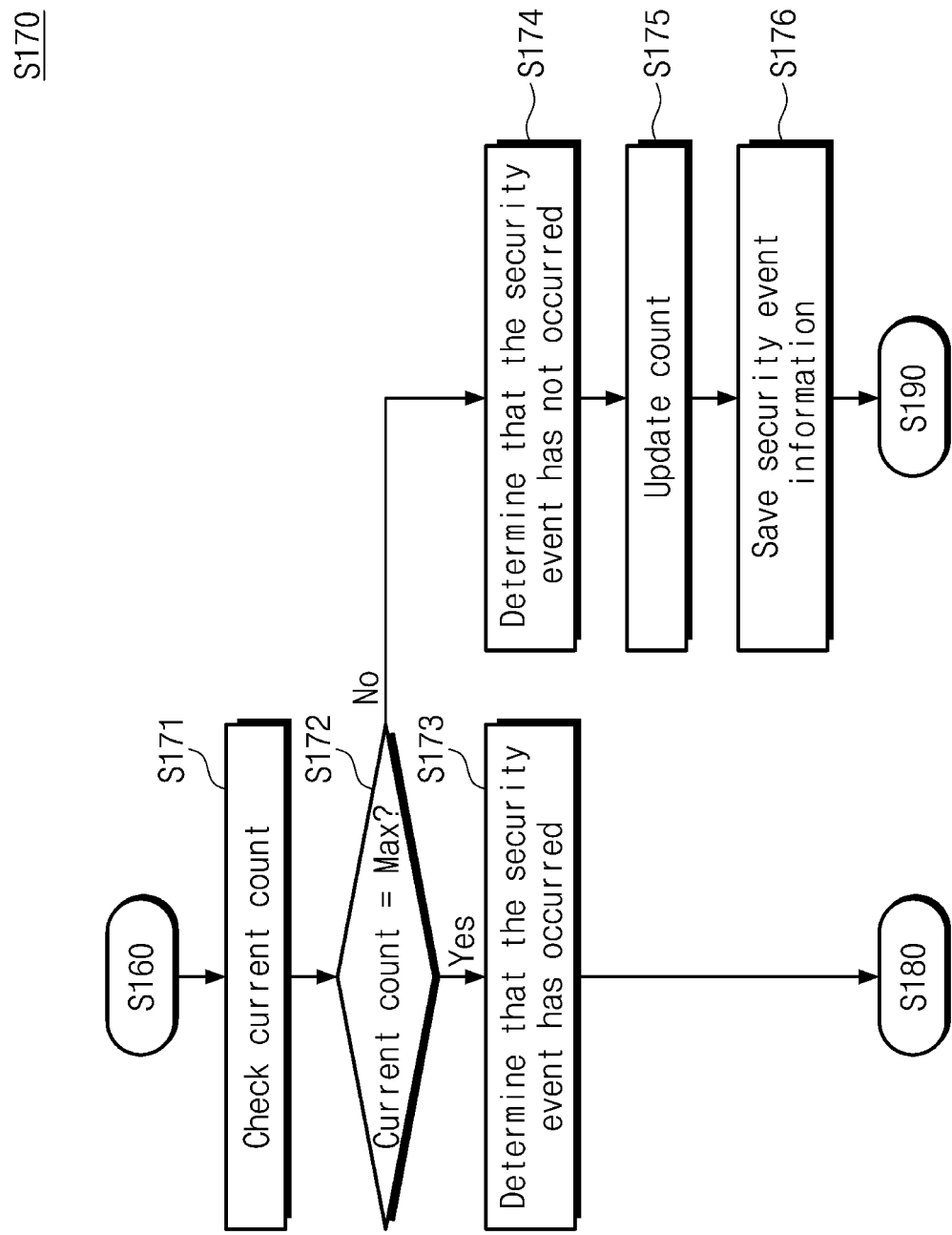
FIG. 5 is a flowchart that describes operation S170 of FIG. 4.

FIG. 5 is a flowchart that illustrates operation S170 of FIG. 4 in detail. Referring to FIGS. 2, 4, and 5, in operation S171, the security device 100 may check a current count.

The current count may be or correspond to an existing attack count stored in the security memory 140.

In operation S172, the security device 100 may determine whether the current count has reached the maximum attack count. The maximum attack count may be set in advance and stored in the security memory 140, and the controller 150 may compare the existing attack count and the maximum attack count. The maximum attack count may be set differently according to different security levels.

According to an embodiment, the existing attack count (e.g., an accumulated attack count) may refer to the number of times that an attack has been made. The maximum attack count may refer to a maximum accumulated attack count that is permitted until the kill signal is generated.

According to an embodiment, the attack count may be calculated for each attack kind. For example, the current count may have a value of "1" with regard to a frequency modulation attack, may have a value of "1" with regard to a voltage modulation attack, and may have a value of "1" with regard to a temperature modulation attack. In this case, the security level may be equal to or lower than a reference level. When the security level is lower than a reference level, the attack count might only be increased for certain types of attacks, or after a certain number of a certain type of attack. For example, the attack In some embodiments, the current count stores attack counts for various types. In other embodiments, there multiple current counts corresponding to each attack type.

According to an embodiment, the attack count may be calculated collectively regardless of an attack kind. For example, when the frequency modulation attack is detected two times, the voltage modulation attack is detected once, and the temperature modulation attack is detected once, the current count may have a value of "4". In this case, the security level may exceed the reference level.

When it is determined that the current count has reached the maximum attack count, in operation S173, the security device 100 may determine that a security event has occurred. For example, when the existing attack count is equal to the maximum attack count, the controller 150 may determine the occurrence of the security event. Afterward, the method proceeds to operation S180, in which the security device 100 generates the kill signal.

When it is determined that the current count has not reached the maximum attack count, in operation S174, the security device 100 may determine that the security event does not occur. For example, when the existing attack count is smaller than the maximum attack count, the controller 150 may determine that the security event does not occur.

In operation S175, the security device 100 may update the current count. For example, the controller 150 may update the current count by increasing the existing attack count by +1. According to an embodiment, the count may be increased for each kind, or may be increased regardless of an attack kind. For example, when the security level exceeds the given level, the count may be increased regardless of an attack kind.

In operation S176, the security device 100 may store event information about the security event. Even though it has been determined that the security event did not occur, the event information may be generated for the probability of future occurrence. For example, the controller 150 may match the attack information and the attack count to generate the event information. According to an embodiment, the controller 150 may encrypt the event information and may store the encrypted event information in the security memory 140. Afterward, the method proceeds to operation S190, in which the security device 100 generates the reset signal.

Figure 6:
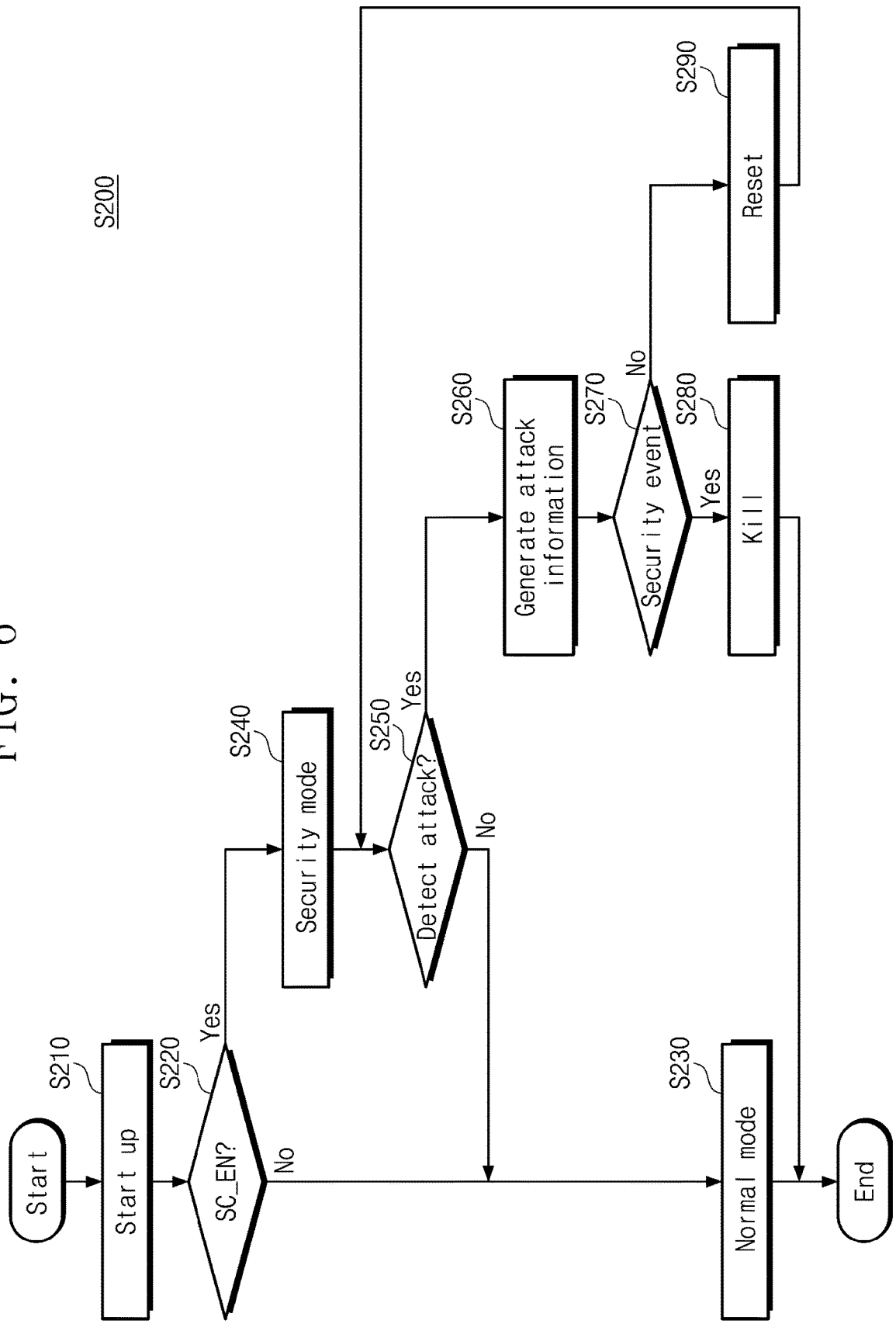
FIGS. 6 and 7 are flowcharts that describe operating methods of a security device according to some embodiments of the present disclosure.
Figure 7:
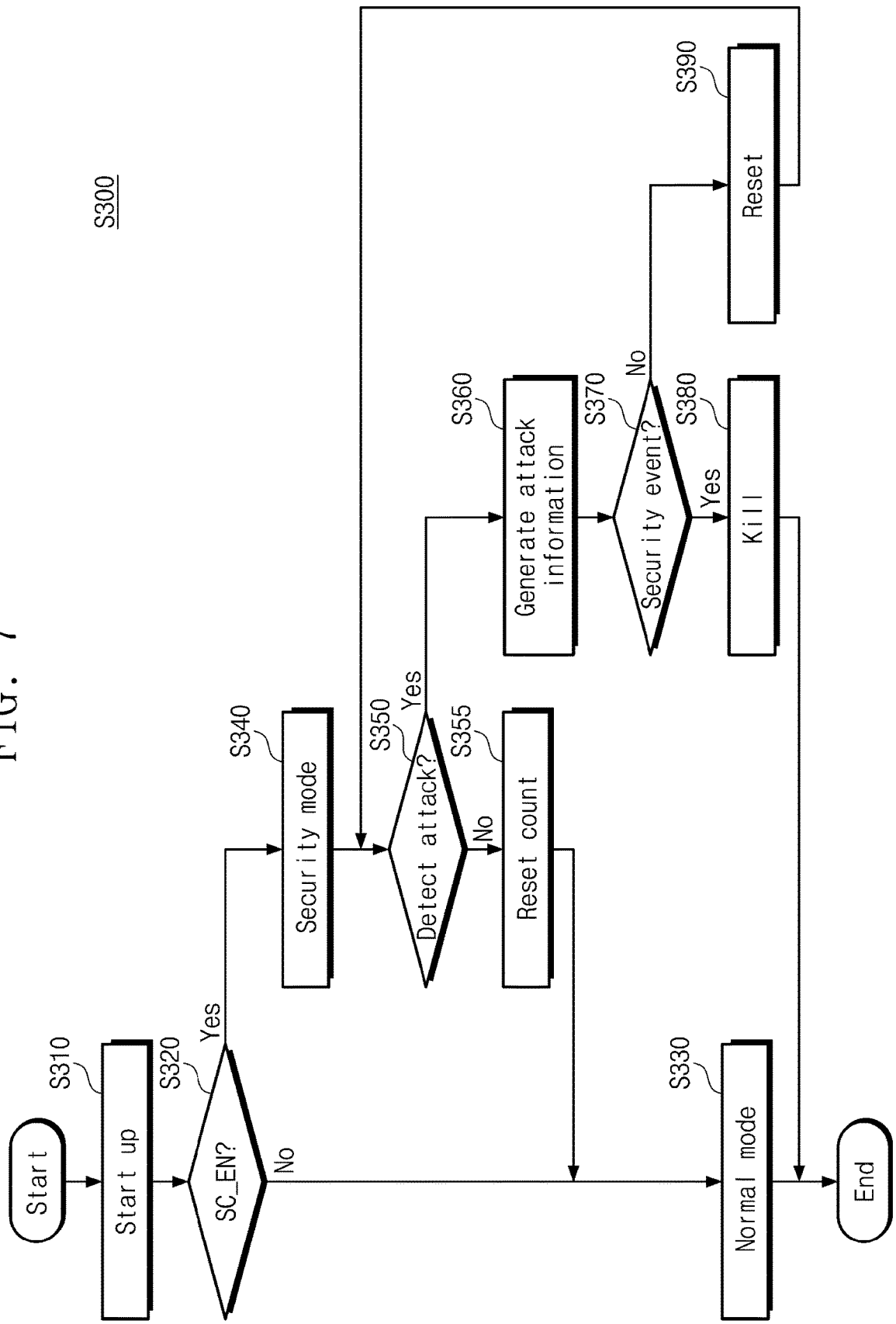

FIGS. 6 and 7 are flowcharts that describe operating methods of a security device according to some embodiments of the present disclosure. The operating method S200 of the security device in FIG. 6 may be performed when the security level is lower than the security level in the example operating method S100 of the security device in FIG. 4. The operating method S300 of the security device in FIG. 7 may be performed when the security level is even lower than the security level in the example operating method S200 of the security device in FIG. 6.

Referring to FIGS. 4 and 6, operation S210, operation S220, operation S230, operation S240, operation S250, operation S260, operation S270, operation S280, and operation S290 of FIG. 6 are similar to operation S110, operation S120, operation S130, operation S140, operation S150, operation S160, operation S170, operation S180, and operation S190 of FIG. 4, and thus, redundant description may be omitted from the following.

In operation S210, the security device 100 may be supplied with a power from a power device, and powered on. In operation S220, the security device 100 may determine whether the enable signal SC_EN for the security circuit SC is received. When the enable signal SC_EN is not received, in operation S230, the security device 100 may operate in the normal mode. When the enable signal SC_EN is received, in operation S240, the security device 100 may operate in the security mode.

In operation S250, the security device 100 may determine whether an attack is detected. When the attack is detected, the security device 100 may enter operation S260. According to an embodiment, when the attack is not detected, the security device 100 may enter operation S230. In this case, an attack detection time may exist. For example, the attack detection time may be 10 minutes; when the attack is not detected for 10 minutes, the security device 100 may enter the normal mode. In this case, the security circuit SC may be deactivated, and power consumption of the security device 100 may be reduced.

For example, when, in the security mode, the detection signal is not received during a given time (e.g., an attack detection time), the monitoring circuit 120 may enter the normal mode. In this case, the monitoring circuit 120 may request a disable signal for the security circuit SC through the interface circuit 130.

In operation S260, the security device 100 may generate attack information about the attack based on the detection signal associated with the attack. In operation S270, the security device 100 may determine whether the security event occurs, based on the attack information. For example, operation S270 may determine whether the security event occurs similar to operation S170 as illustrated in FIG. 5. In operation S280, the security device 100 may generate the kill signal in response to determining that the security event occurs. In operation S290, in response to determining that the security event did not occur, the security device 100 may store the event information about the security event and may generate the reset signal.

Referring to FIGS. 4 and 7, operation S310, operation S320, operation S330, operation S340, operation S350, operation S360, operation S370, operation S380, and operation S390 of FIG. 7 are similar to operation S210, operation S220, operation S230, operation S240, operation S250, operation S260, operation S270, operation S280, and operation S290 of FIG. 6, and redundant description may be omitted from the following.

The operating method S300 of the security device in FIG. 7 may further include operation S355. For example, when it is determined in operation S350 that the attack is not detected during the attack detection time, the security device 100 may enter operation S355.

In operation S355, the security device 100 may reset the count. In one illustrative example, the existing attack count is "2", the security device 100 may reset the existing attack count of "2" when the attack is not detected during a given time (e.g., an attack detection time). Then, the existing attack count or the current count may be reset to "0". Afterwards, in operation S330, the security device 100 may enter the normal mode.

The operating method S300 of the security device may lower the security level of the security device through the count reset. When attack is not detected during the attack detection time, it may be possible to perfectly prepare for a new attack by resetting the count. The security device according to the present disclosure may perform different operating methods depending on security levels, and thus, the efficient operation of the security device 100 may be secured.

Figure 8:
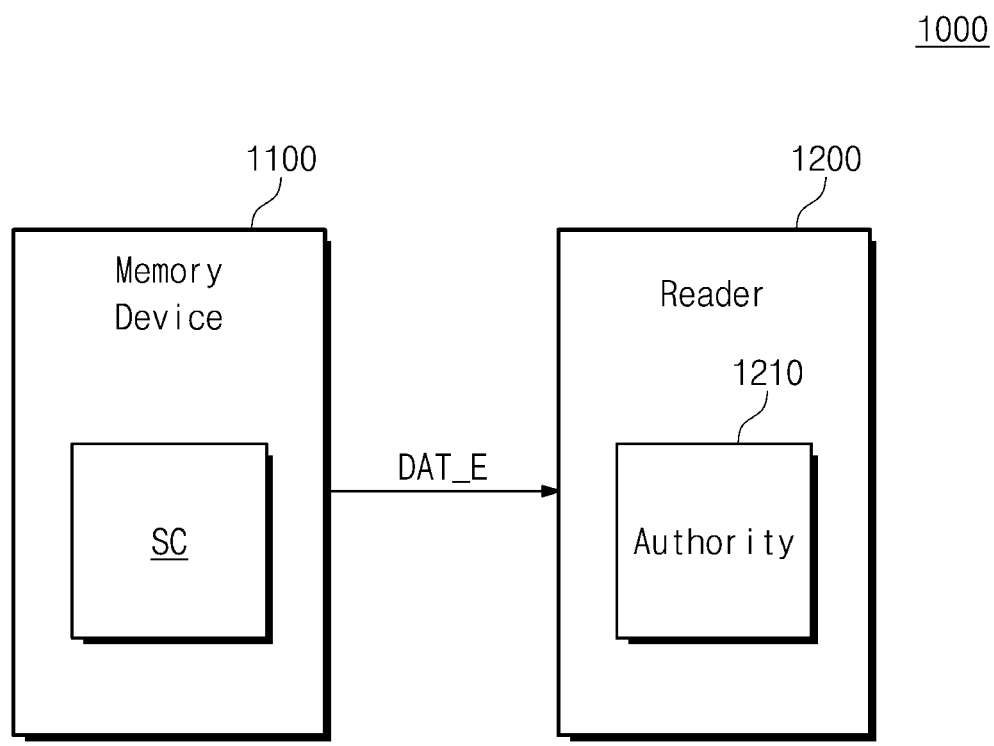
FIG. 8 is a block diagram that illustrates a memory system including the security circuit SC of FIG. 2.

FIG. 8 is a block diagram that illustrates a memory system including the security circuit SC of FIG. 2. Referring to FIGS. 2 and 8, a memory system 1000 may include a memory device 1100 and a reader 1200.

The memory device 1100 may include the security circuit SC. According to an embodiment, the memory device 1100 may correspond to the security device 100 of FIG. 2 or the receiver 20 of FIG. 1. The security circuit SC may be implemented with hard-wired logic and may be configured to be activated in the security mode. The security mode may be determined according to a signal generated from within the memory device 1100 or outside of it, according to various embodiments. The description of the security circuit SC given with reference to FIG. 2 may be applied to the security circuit SC of the memory device 1100 without modification, and thus, additional description will be omitted to avoid redundancy.

According to an embodiment, the memory device 1100 may experience a security event, and accordingly, processes and power signals therein may be disabled. Accordingly, the security circuit SC include encrypted event information stored therein. For example, the security memory 140 may be a nonvolatile memory; in this case, the event information is be lost (e.g., may be retained) even though the security memory 140 is killed.

The reader 1200 may receive the event information from the memory device 1100. For example, the event information may be provided to the reader 1200 as encrypted data DAT_E. The reader 1200 may read the event information stored in the security circuit SC. For example, the memory device 1100 may be an IC card, and the reader 1200 may be a card reader configured to read the IC card. However, the present disclosure is not limited thereto.

The reader 1200 may include an authority 1210 for reading the event information stored in the security circuit SC. For example, the reader 1200 may receive the encrypted data DAT_E and may decrypt the encrypted data DAT_E through the authority 1210. The authority 1210 may be a component configured to interface or communicate with the memory device 1100. The decrypted data may be analyzed through the countermeasure, and may be utilized to update the security device 100.

Figure 9:
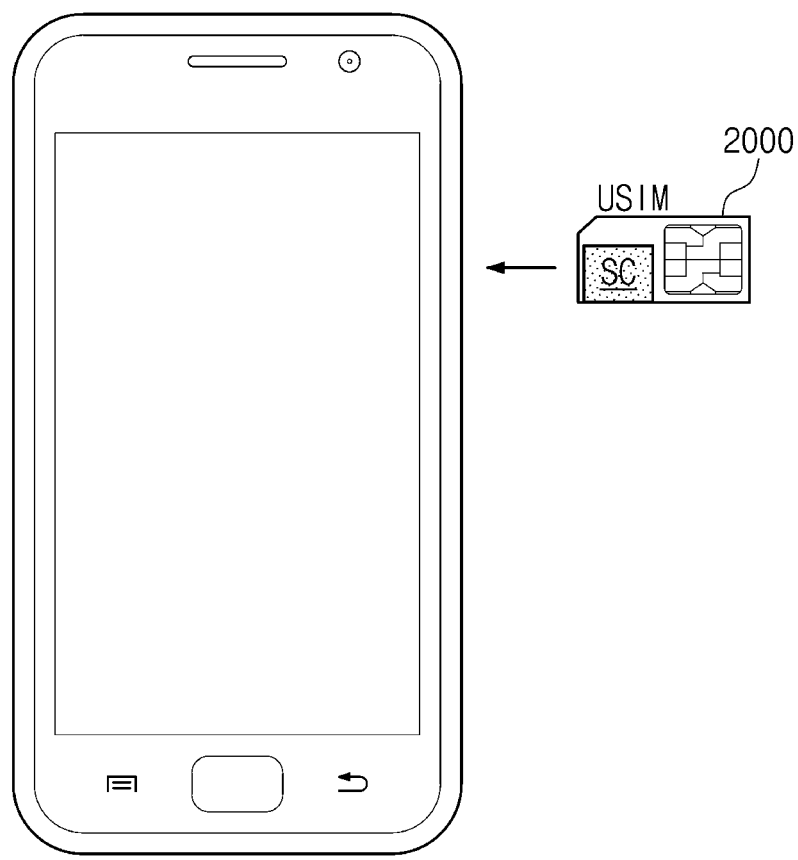
FIG. 9 is a diagram that illustrates a mobile device including a security chip.

FIG. 9 is a diagram that illustrates a mobile device including a security chip 2000. Referring to FIG. 9, a security chip 2000 may include the security circuit SC described with reference to FIGS. 1 to 8. According to an embodiment, the security chip 2000 may be an SIM card, an USIM card, a smart card, or the like.

The security circuit SC according to an embodiment of the present disclosure may be applicable to a security product embedded in a mobile device.

Figure 10:
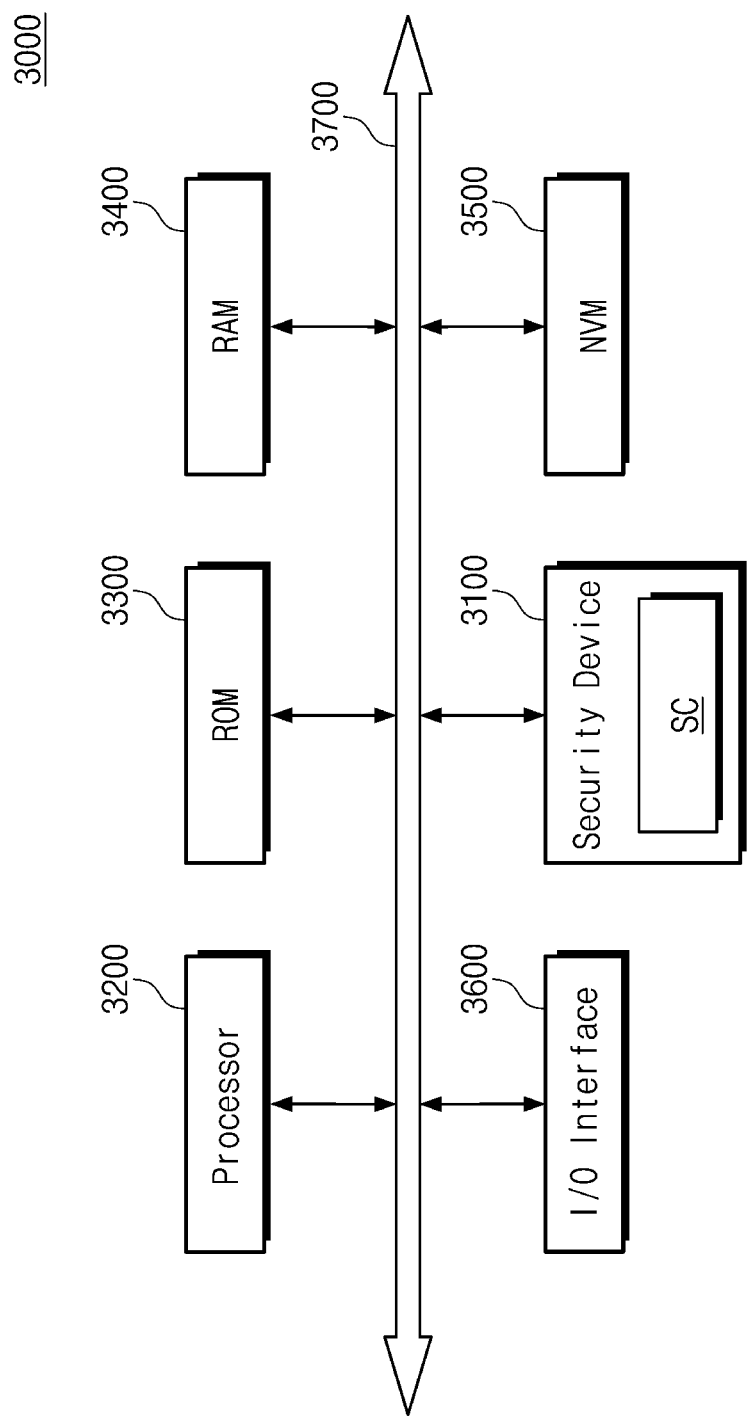
FIG. 10 is a block diagram that illustrates an example in which a security device according to an embodiment of the present disclosure is implemented as an electronic device.

FIG. 10 is a block diagram that illustrates an example in which a security device according to an embodiment of the present disclosure is implemented as an electronic device. Referring to FIG. 10, an electronic device 3000 may include a security device 3100, a processor 3200, a ROM 3300, a RAM 3400, a nonvolatile memory 3500, an input/output (I/O) interface 3600, and a bus 3700. The security device 3100 may include the security circuit SC described with reference to FIGS. 1 to 8.

The processor 3200 may control an overall operation of the electronic device 3000. The processor 3200 may execute instructions stored on a memory such as ROM 3300, RAM 3400, and/more nonvolatile memory 3500. The instructions may be a part of a firmware for driving the electronic device 3000. The firmware may be loaded and driven on the RAM 3400. The processor 3200 may allow the security device 3100 to operate in the security mode. For example, the processor 3200 may generate the enable signal for the security circuit SC.

Software or firmware for controlling the electronic device 3000 may be loaded on the RAM 3400. For example, a flash translation layer may be loaded on the RAM 3400. The RAM 3400 may be used as a buffer memory, a cache memory, or a working memory of the electronic device 3000.

The ROM 3300 may store a variety of information, which is necessary for the electronic device 3000 to operate. For example, the ROM 3300 may additionally store firmware. For example, the flash translation layer and cord data for performing interfacing with a host may be stored in the ROM 3300.

The I/O interface 3600 may provide an interface between an external device (e.g., a host) and the electronic device 3000. The electronic device 3000 may communicate with the external device (e.g., a host or an application processor) through the I/O interface 3600. For example, the I/O interface 3600 may include at least one of various interfaces such as a universal serial bus (USB) interface, a multimedia card (MMC) interface, an eMMC (embedded MMC) interface, a peripheral component interconnection (PCI) interface, a PCI-express (PCI-E) interface, an advanced technology attachment (ATA) interface, a serial-ATA interface, a parallel-ATA interface, a small computer small interface (SCSI), an enhanced small disk interface (ESDI), an integrated drive electronics (IDE) interface, a Firewire interface, and an universal flash storage (UFS) interface.

The nonvolatile memory 3500 may include, for example, a flash memory, an MRAM, a PRAM, an FRAM, or the like. The nonvolatile memory 3500 may receive and store the attack information from the security device 3100 in the normal mode.

The bus 3700 may correspond to a circuit that interconnects the above components 3100 to 3600 and conveys communications (e.g., data and messages) between the above components 3100 to 3600.

Figure 11:
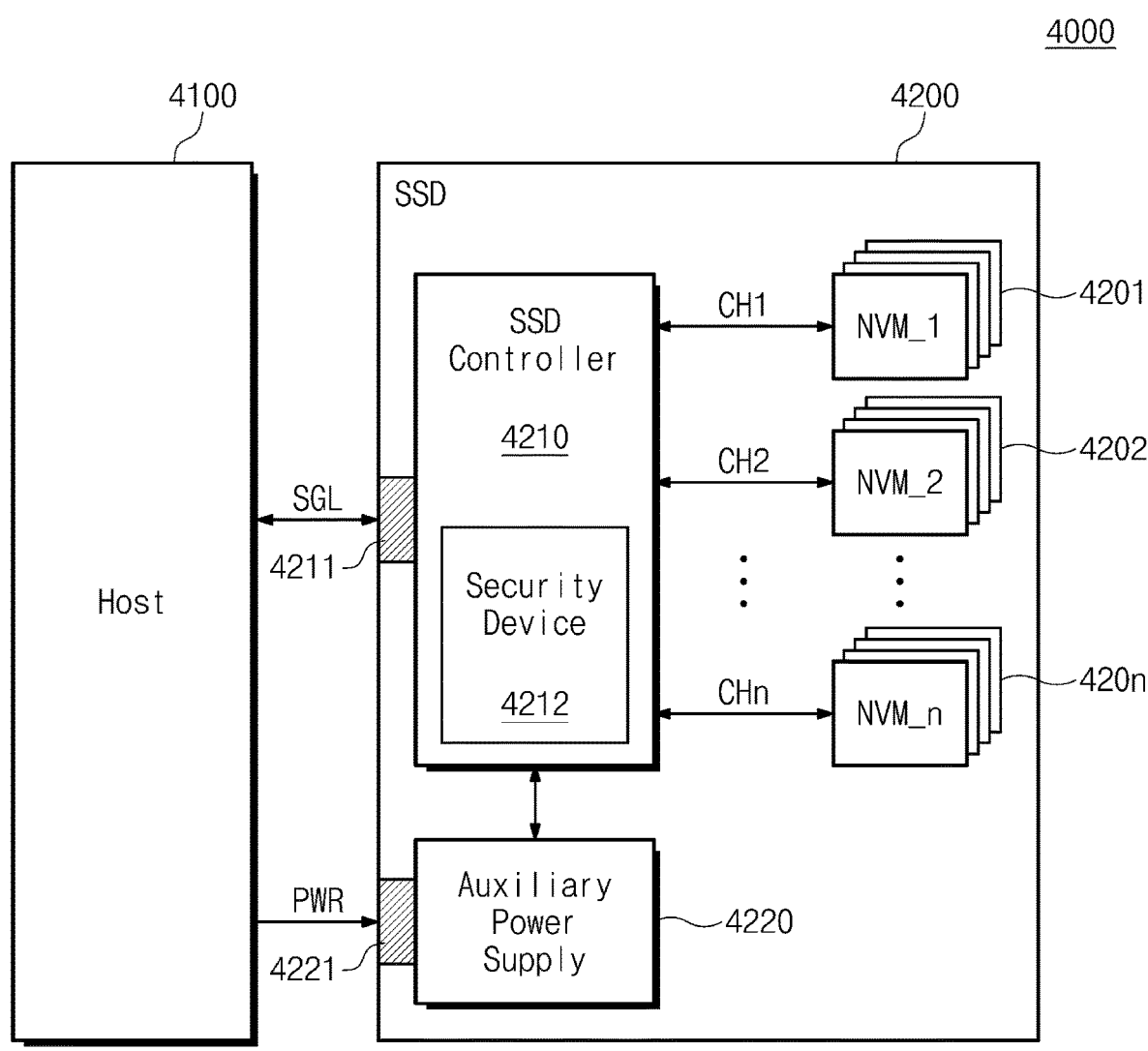
FIG. 11 is a block diagram that illustrates an example in which a security device according to an embodiment of the present disclosure is applied to a solid state drive.

FIG. 11 is a block diagram that illustrates an example in which a security device according to an embodiment of the present disclosure is applied to a solid state drive (SSD). Referring to FIG. 11, an SSD system 4000 includes a host 4100 and an SSD 4200.

The SSD 4200 exchanges a signal SGL with the host 4100 through a signal connector 4211 and receives a power through a power connector 4221. The SSD 4200 may include a plurality of flash memories 4201 to 420n, an SSD controller 4210 and an auxiliary power supply 4220.

The plurality of flash memories 4201 to 420n are used as a storage medium of the SSD 4200. A nonvolatile memory device such as a PRAM, an MRAM, a ReRAM, or an FRAM may additionally be used as a storage medium of the SSD 4200. The plurality of flash memories 4201 to 420n may be connected with the SSD controller 4210 through a plurality of channels CH1 to CHn. One or more flash memories may be connected with one channel. Flash memories connected with one channel may be connected to the same data bus.

The SSD controller 4210 exchanges a signal SGL with the host 4100 through the signal connector 4211. Herein, the signal SGL may include a command, an address, data, and the like. Depending on a command of the host 4100, the SSD controller 4210 writes data in a corresponding flash memory or reads data from a corresponding flash memory. According to an embodiment, the SSD controller 4210 may include a security device 4212 described with reference to FIGS. 1 to 8.

The auxiliary power supply 4220 is connected with the host 4100 through the power connector 4202. The auxiliary power supply 4220 may receive a power PWR through the power connector 4221 from the host 4100 and may be charged with the received power PWR. The auxiliary power supply 4220 may be located inside the SSD 4200 or may be located outside the SSD 4200. For example, the auxiliary power supply 4220 may be located on a main board and may provide an auxiliary power to the SSD 4200.

An electronic device according to embodiments of the present disclosure may include a security circuit implemented with hard-wired logic (e.g., circuitry) and thus may store information about a security event without the intervention of software. The electronic device may further allow information about security events to be stored even though other components of the device are shut down, so that the information may be analyzed later. Accordingly, the security vulnerability may be reduced, and a safe countermeasure against an external attack may be implemented.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device, comprising:
one or more detectors configured to detect an external attack;
a monitoring circuit configured to receive a detection signal from the one or more detectors in response to the external attack, and to generate attack information about the external attack from the detection signal; and
a security circuit implemented with hard-wired logic and configured to be activated in a security mode, and wherein the security circuit includes:
a controller configured to receive the attack information from the monitoring circuit and to determine whether a security event has occurred by calculating an attack count from the attack information; and
a security memory configured to encrypt and store event information about the security event, responsive to a determination from the controller that a security event has occurred.

2. The electronic device of claim 1, wherein the one or more detectors include a frequency detector, a voltage detector, a temperature detector, a light exposure detector, or a glitch detector, and
wherein, when the one or more detectors detect an abnormal signal that is outside of a reference set in advance for each detector, the one or more detectors provide the detection signal to the monitoring circuit.

3. The electronic device of claim 2, wherein the attack information generated by the monitoring circuit includes information about an attack kind, an attack time, or an attack level associated with the abnormal signal.

4. The electronic device of claim 3, further comprising:
an interface circuit configured to transmit and receive a signal with an external device,
wherein the monitoring circuit is configured to:
provide the attack information to an external memory through the interface circuit in a normal mode; and
provide the attack information to the controller in the security mode.

5. The electronic device of claim 4, wherein, when the monitoring circuit has not received the detection signal a given time during the security mode, the monitoring circuit requests a disable signal for the security circuit through the interface circuit, to disable the security circuit and enter the normal mode.

6. The electronic device of claim 1, wherein the controller is configured to:
check an existing attack count stored in the security memory;
determine whether the existing attack count has reached or exceeded a maximum attack count; and
in response to determining that the existing attack count has reached or exceeded the maximum attack count, determine that the security event has occurred and generate a kill signal.

7. The electronic device of claim 6, wherein, in response to determining that the existing attack count has not reached the maximum attack count, the controller is configured to:
determine that the security event does not occur;
increment the existing attack count;
generate the event information including the attack information and the attack count; and
generate a reset signal.

8. The electronic device of claim 7, wherein the one or more detectors return to a setting state stored therein in response to the reset signal.

9. The electronic device of claim 1, wherein the security circuit further includes:
a crypto circuit configured to encrypt the event information according to an encryption algorithm, and to store the encrypted event information in the security memory.

10. The electronic device of claim 1, wherein the security memory includes a nonvolatile memory.

11. An operating method of an electronic device which includes a security circuit, the method comprising:
enabling a security mode of the electronic device in response to an enable signal for the security circuit;
detecting an external attack and generating attack information about the attack while in the security mode;

determining whether a security event has occurred by calculating an attack count based on the attack information;

responsive to a determination that the security event has occurred, generating a kill signal configured to disable one or more components of the electronic device; and responsive to a determination that the security event has not occurred, storing event information about the security event and generating a reset signal, wherein the security circuit is implemented with hard-wired logic.

12. The method of claim 11, wherein the enable signal is generated based on a selection made on the electronic device by a user, or is automatically generated at regular intervals.

13. The method of claim 11, wherein the generating of the attack information includes:

detecting an abnormal signal from a detector, the abnormal signal being out of a reference value set in advance based on a detector type; and generating the attack information including information about an attack kind, an attack time, or an attack level associated with the abnormal signal.

14. The method of claim 11, wherein the determining whether the security event has occurred includes:

checking a stored existing attack count; and determining whether the existing attack count has reached or exceeded a maximum attack count.

15. The method of claim 14, wherein the determining of whether the security event has occurred further includes:

in response to a determination that the existing attack count has reached or exceeded the maximum attack count, determining that the security event has occurred; and generating the kill signal.

16. The method of claim 14, wherein the determining of whether the security event has occurred further includes:

in response to a determination that the existing attack count has not reached the maximum attack count, determining that the security event has not occurred;

incrementing the existing attack count;

generate the event information including the attack information and the attack count; and generating the reset signal.

17. The method of claim 16, wherein the generating of the event information includes:

encrypting the event information according to an encryption algorithm; and storing the encrypted event information in a security memory included in the security circuit.

18. The method of claim 11, wherein the security memory includes a nonvolatile memory.

19. A system comprising:

a memory device including a security circuit, wherein the security circuit is implemented with hard-wired logic, and wherein the security circuit is configured to be activated in a security mode; and a reader configured to read event information stored in the security circuit, wherein the security circuit includes:

a controller configured to receive attack information about an external attack and to determine whether a security event has occurred by calculating an attack count from the attack information; and a security memory configured to encrypt and store the event information about the security event.

20. The system of claim 19, wherein the reader includes a decoder for decrypting the event information encrypted.

* * * * *